US012728793B2

(12) United States Patent
Kanika et al.

(10) Patent No.: US 12,728,793 B2
(45) Date of Patent: Sep. 8, 2026

(54) ALERT DETECTION SYSTEM

(71) Applicant: TVS MOTOR COMPANY LIMITED, Chennai (IN)

(72) Inventors: Choudhary Kanika, Chennai (IN); Mohan Barath, Chennai (IN); Sharma Abhishek, Chennai (IN); Sai Praveen Velagapudi, Chennai (IN); Venkata Manga Raju Karanam, Chennai (IN)

(73) Assignee: TVS Motor Company Limited, Chennai (IN)

( * ) Notice: Subject to any disclaimer, the term of this patent is extended or adjusted under 35 U.S.C. 154(b) by 373 days.

(21) Appl. No.: 18/007,163

(22) PCT Filed: Oct. 30, 2020

(86) PCT No.: PCT/IN2020/050916

§ 371 (c)(1),
(2) Date: Jan. 27, 2023

(87) PCT Pub. No.: WO2022/024136

PCT Pub. Date: Feb. 3, 2022

(65) Prior Publication Data

US 2023/0234500 A1 Jul. 27, 2023

(30) Foreign Application Priority Data

Jul. 27, 2020 (IN) ............................ 202041032202

(51) Int. Cl.
*B60Q 9/00* (2006.01)
*B60R 1/12* (2006.01)

(52) U.S. Cl.
CPC ........... *B60Q 9/008* (2013.01); *B60R 1/1207* (2013.01)

(58) Field of Classification Search
None
See application file for complete search history.

(56) References Cited

U.S. PATENT DOCUMENTS 3,950,098 A * 4/1976 Caine .................... G08G 1/166 356/3
5,374,917 A * 12/1994 Hoffman ............. G07C 5/0825 340/459

(Continued)

FOREIGN PATENT DOCUMENTS

DE 102005036593 A1 2/2007
DE 102006056444 A1 7/2008

(Continued)

OTHER PUBLICATIONS

Written Opinion issued in corresponding International Application No. PCT/IN2020/050916 mailed May 3, 2021 (9 pages).

(Continued)

*Primary Examiner* — Muhammad Adnan
(74) *Attorney, Agent, or Firm* — Osha Bergman Watanabe & Burton LLP

(57) ABSTRACT

An alert detection system for a vehicle includes: a sensor unit; a controller; and an alert indication unit, the controller receiving at least one or more input signals from at least the sensor unit and determining one or more output indicators based on the at least one or more input signals, and the one or more output indicators including a first output indicator, a second output indicator, and a third output indicator which are Level 1 alert, Level 2 alert, and Level 3 alert, and the one or more output indicators being progressively actuated based on signal received from the at least one or more of input signals.

7 Claims, 14 Drawing Sheets

(56) References Cited

U.S. PATENT DOCUMENTS 5,457,439 A * 10/1995 Kuhn .................... B60K 35/22 340/479
6,587,043 B1 * 7/2003 Kramer .................. B60Q 9/008 340/436
9,050,930 B2 * 6/2015 Walsh .................... B60Q 1/535
9,384,645 B1 * 7/2016 Allen ....................... G08B 3/10
9,514,651 B2 * 12/2016 Linder ................. G08G 1/0967
9,852,634 B2 * 12/2017 Maytal ................... G08B 29/02
10,368,602 B2 * 8/2019 Dodson ................ A42B 3/0426
11,453,395 B2 * 9/2022 Dorenkamp .......... B60W 30/16
11,834,122 B2 * 12/2023 Tetsuka ................. G01S 13/931
12,084,069 B2 * 9/2024 Tod ........................ G06Q 10/04
2001/0012976 A1 * 8/2001 Menig .................... B60K 35/60 701/1
2007/0229238 A1 * 10/2007 Boyles .................. G06T 7/0008 348/148
2013/0093582 A1 * 4/2013 Walsh .................... G08G 1/166 340/436
2013/0311075 A1 * 11/2013 Tran ...................... B60Q 1/535 701/117
2014/0340211 A1 * 11/2014 Hennessey .......... B60R 16/0236 340/439
2016/0203717 A1 * 7/2016 Ginsberg ......... G08G 1/096883 701/117
2017/0088053 A1 * 3/2017 Orellana ................... B60R 1/12
2017/0291543 A1 * 10/2017 Goldman-Shenhar ... B60Q 9/00
2018/0178782 A1 * 6/2018 Saiki ..................... B60W 30/09
2018/0190124 A1 * 7/2018 Kim ................ B60W 30/18163
2020/0180657 A1 * 6/2020 Iwamoto ................ G06V 20/58
2020/0223450 A1 * 7/2020 Iwamoto .............. G05D 1/0212
2020/0269868 A1 * 8/2020 Giraud ..................... B62J 25/06
2020/0398065 A1 * 12/2020 Engman ............... A61N 1/3925
2025/0074408 A1 * 3/2025 Katayama ............. B60W 50/14
2025/0131826 A1 * 4/2025 Doi ........................ G08G 1/166
2025/0166482 A1 * 5/2025 Sundaram ............... G01S 13/88
2025/0323427 A1 * 10/2025 Brankovic ........... H01Q 1/3233

FOREIGN PATENT DOCUMENTS

EP 0657314 B1 8/1997
EP 1312499 A2 5/2003
GB 2386732 A 9/2003
WO 2001/045067 A1 6/2001

OTHER PUBLICATIONS

International Search Report issued in corresponding International Application No. PCT/IN2020/050916 mailed May 3, 2021 (4 pages).

* cited by examiner

ALERT DETECTION SYSTEM

TECHNICAL FIELD

The present subject matter relates to a vehicle. More particularly, the present subject matter relates to an alert detection system in the vehicle.

BACKGROUND

Alert detection system have been developed in order to alert rider's about the presence of a vehicle or other object in rider's blind spot, in collision zone or alert the rider's about the high speed of the vehicle. The alert detection system assists the rider in critical situation to prevent accidents with other vehicle or pedestrians. These systems take the input from different sensors installed on the vehicle. The most common sensors used in these systems are camera, lidar, radar, ultrasonic sensor, pressure sensor, wheel speed sensor, tilt sensor etc.

BRIEF DESCRIPTION OF THE DRAWINGS

The detailed description is described with reference to an embodiment of a motorcycle type two wheeled saddle vehicle along with the accompanying figures. The same numbers are used throughout the drawings to reference like features and components.

DETAILED DESCRIPTION

Figure 1:
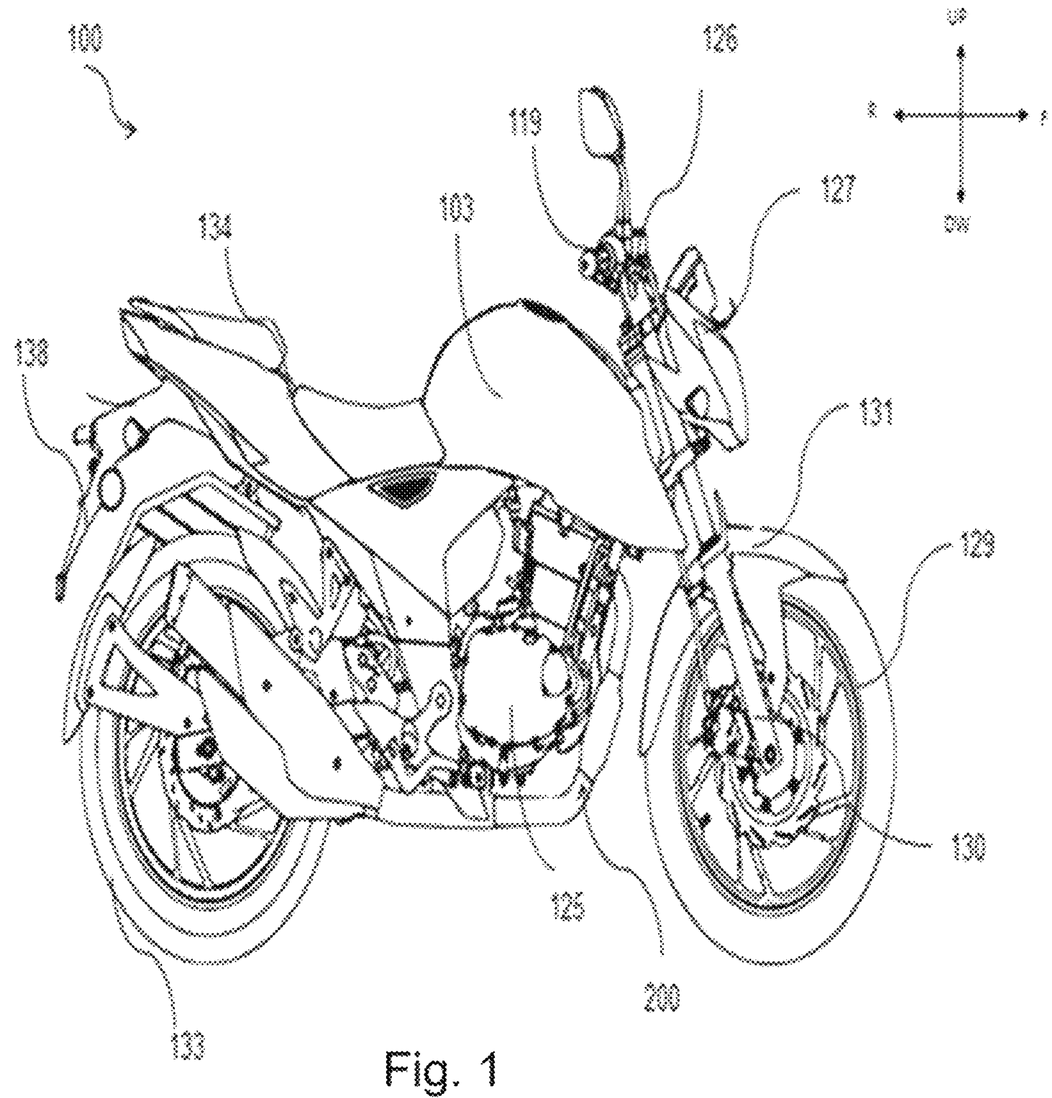
FIG. 1 is a right side view of a saddle type vehicle as per one embodiment of the present invention.

Driving a vehicle in modern traffic conditions is a very complicated and dangerous task. The rider must be aware of all oncoming road hazards and traffic control devices including stopped cars, pedestrians crossing and red lights. Highway driving poses a dangerous task of watching oncoming road hazards while at the same time keeping a watch on vehicles coming from back or sides while travelling at high speeds. This significantly reduces the fraction of time available to sight the objects, analyses and process information for the human brain and take required decisions in fraction of a moment. It is necessary to look both sideways and backwards before safely changing lanes on a highway. A failure to properly look both sideways and backwards before changing lanes can lead to serious high speed accidents. Such accidents often cause serious bodily harm or fatality.

Road safety is an important parameter to ensure public health in society. Unintentional injuries resulting from road traffic accidents are the major cause of death of the riders. Vehicular crashes happen in a split second. Sometimes they are avoidable, sometimes they are not. Four key factors in vehicular collisions include the road conditions, the weather, the vehicle itself, and most importantly, rider skill. The rider's skill, attentiveness, and judgment play a key role, and the speed of the vehicle is most important in determining the severity of the crash.

When a rider is distracted, tired, or intoxicated, they are less likely to react as quickly or safely to driving situations. The rider should have undivided attention so that they can react to any driving situation, especially when they don't know the skill level or the emotional condition of other drivers/riders on the road. If the rider is not paying attention to their own driving or the driving of the others, the slightest mistake can prove costly/can cause fatal accidents. The repercussions from speeding and collisions include fines, increased insurance premiums, or in some cases riders may lose their life.

Local road safety initiatives are commonly implemented to reduce accidents and injuries resulting from drivers/riders of the vehicles. In certain areas, photo radar and Red Light Camera (RLC) technology is used as a means to enforce traffic safety laws, particularly speeding and red light running. Locations of such photo detection systems are visible within the general community via road signs, and are accessible on the Internet on local police websites. Such access to information is provided to increase an individual's awareness of the RLC locations.

Portable GPS receivers capable of programming waypoint (points of interest) markers is one alternative that can be used for the purpose of making note of RLC locations based on latitude and longitude coordinates. Visual displays requiring driver attention can distract a driver of a vehicle from watching the road ahead, and may result in an unsafe driving environment. Such map-based navigational systems are also complex to use as well as program and are relatively expensive.

Apart from the speeding and red light running, there are other important factors if not taken care of, which result into the fatal accident of the riders/drivers of the vehicle. The factors are Blind spot of the vehicles; forward collision and rear collision of the vehicle, tire pressure of the vehicle, nonfunctioning of brake of the vehicle, Throttle response of the vehicle etc.

The rider's blind spot is that portion of the vehicle in which an object will not normally be observed by the use of interior and exterior mirrors of the vehicle. The most difficult area for a rider to monitor is the rider's blind spot. Blind spots are attributable to, among other things, voids in coverage provided by mirrors that are positioned on the vehicle and by visual interference caused by objects (e.g. a part of the vehicle or an object being transported thereon or therein) which are located in the rider's line of vision. Apart from alerting riders about the blind spot of the vehicles, it is also important to maintain the air pressure in the tire at the appropriate state or protect the riders from front or rear collision.

Hence, to monitor the above mentioned factors, an ADA system (Active Drive Assist system), i.e., a comprehensive driver assisting system for actively assisting the driver/rider in driving a vehicle, has been developed. This system is an attempt to enhance the safety of vehicles to cope with progressively increasing traffic accidents. The recognition of the conditions of the surroundings is an essential function of the ADA system. The three dimensional recognition of road conditions and traffic conditions is possible in a practically effective accuracy and time because of the development of active drive assist system. This is done by processing image information about a scene lying ahead/behind of the vehicle acquired by a plurality of cameras. The ADA system is intended to assist the driver to drive a vehicle safely in many respects by using input data on road conditions and traffic conditions when the driver looks aside and/or when the driver dozes off at the wheel during monotonous driving.

The warning provided by the ADA system is very important for estimating various possible conditions and enhancing preventive security. Therefore, it is necessary to warn properly to enable the driver to take danger avoiding measures by deciding the situation and accurately estimating a possible condition. Off-course travel at a sharp curve is one of the possible conditions. Particularly, off-course travel is liable to occur while the vehicle traveling a sharply curved exits a ramp immediately after leaving a lane of a highway, because the driver's sense of speed is numbed and it is desirable to give an appropriate warning against such off-course travel.

Another form of drive assistance system is the passive drive assistance system. The active drive assistance system and passive drive assistance system are the two types of the drive assist system. The active drive assistance systems are those in which there is an active control of engine units by the controller. These systems include Adaptive Cruise control, Throttle control, Brake control & anti-brake system etc.

The active drive assistance system gives a warning to the driver against an expected danger, for example, it assists the driver when a car collision or off-course travel is expected. When the driver does not take appropriate measures to avoid danger in response to the warning, it carries out operations temporarily for the driver to avoid a car collision or off-course travel by automatically controlling the brake system, the throttle and/or the steering system to return the condition to safety.

The passive drive assistance system include system that identifies a potential accident and issue a warning to the rider in the form of haptic, visual or audio alerts. These systems do not take full control of the vehicle. They warn the rider ahead of time about an approaching risk, so that the rider can take appropriate action to prevent a potential collision or accident. These systems include Lane change alert system, Forward Collision warning system, Rear Collision warning system, Blind Spot detection system, High Speed alert system, Lane Departure warning, Tire Pressure Monitoring System etc.

Therefore, from the above mentioned paragraphs it is quite clear that the factors like blind spot, forward or rear collision in the vehicle has been a threat to the life of the riders of the vehicle. These factors creates problem for the riders riding vehicle in developing countries which have significant traffic as well as developed economies involving high speed biking. Hence, one solution proposed for this problem is to use different types of ADA system in the vehicle like active drive assistance system and passive drive assistance system. The active drive assistance system controls the vehicle without driver intervention as it is operated directly through the controller. However, the passive drive assistance system has its own limitations/drawbacks. In recent times, various passive drive assistance systems are installed in the vehicle, like forward collision warning, blind spot detection etc. These warning systems are operated in same time but do not have a common method to indicate it to the riders/drivers. Also, in some cases, when the measured signal as measured by the controller falls below the threshold signal, the alert is issued to the rider to alert the rider about the approaching vehicle. In this case, the rider is aware only about the approaching vehicle, not about other important factors like distance between the vehicles etc. Taking example, in forward collision warning system, a warning is issued to the rider if the measured distance signals i.e. distance between vehicle and the target vehicle is below a certain threshold safe distance. Suppose the safe threshold distance between the vehicle and the target vehicle in the front is 20 m. Same alert will be issued to the rider, if the detection distance of the target vehicle is 19 m or 14 m or 5 m or 2 m (as all distances are less than the safe threshold distance 20 m). So, in this case, the rider will not get any idea about the time he has and how quickly he needs to respond so as to prevent the accident or collision or reduce the severity of the collision. Taking example of lane changing, when the measured signal is less than the threshold signal and the rider of the vehicle has to change lane, in this case also, rider has to be informed about the appropriate distance of the approaching vehicle and level of risk associated with the lane changing by the rider at that point of time. Therefore, there is a need of a single alert detection system which detects the alerts like distance between the vehicle and the target vehicle, risk associated with the lane changing by the rider etc. issued by various passive drive assist systems of the DA system and communicate it to the rider riding vehicle within appropriate time to avoid any collision/accidents.

In known art, for blind spot detection of the vehicle, one or more of a left rear view mirror, a right rear view mirror and a central rear view mirror are used to inform the rider about the blind spot area of the vehicle through a suitable means like indicator. This solves the problem of blind spot of the area up to certain extent but raises another problem like; the disclosed system does not inform the rider about the risk associated while changing the sides on the road, the rate at which the target vehicle in the blind spot area of the vehicle is approaching etc.

In another known art, for a four wheeled vehicle, an indicator system is proposed to communicate the rider about the risk associated with the lane changing on the road with the help of flashing frequency of LED. However, the disclosed system is not suitable for a saddle type vehicle, because unlike as four wheeled vehicle, the saddle type vehicle does not have the closed cabin space and needs to have undistracted attention on the environment with higher cognitive stress in terms of vehicle balance, actuation of braking, throttle, gear shift etc. Thus, the flashing frequency of the LED cannot help in safely communicating to the rider about the alert issued in the vehicle.

Further, in another known art, vehicle warning system depending upon the size of the vehicle is disclosed. An alert is issued and communicated to the rider through suitable means, upon the size of the approaching vehicle to avoid any collision. However, it does not disclose the alert indication system when the approaching vehicle is of small size which may be approaching at very high speed. A small size vehicle approaching at very high speed can also cause a huge damage to the vehicle in the collision or also raises safety concern for the rider.

Furthermore, in another known art, a warning system is proposed for a vehicle. The warning system includes a visual signal displayed in a field of view of the rider. However, this system does not alert the rider about the speed of the approaching vehicle, thereby increasing the safety risk of the rider.

Hence, there exists a challenge of designing a single alert detection system for passive drive assistance system, which can satisfactorily cover alert for all the passive drive assistance warning systems thereby increasing rider's safety in a dense traffic also and overcoming all problems cited above as well as other problems of known art.

Additionally there exists a challenge of designing an alert detection system which can work by selecting a type of alert and providing differentiated level of alerts and risk associated with it, for various warning systems.

Therefore, there is a need to have an improved alert detecting system which overcomes all of the above problems and other problems known in art.

The present subject matter discloses an alert detection system having sensor unit, a controller and an alert indication unit to ensure issuance of alert for various warning systems while ensuring safety of the riders.

As per one aspect of the present invention, a vehicle comprising an alert detection system is disclosed. The alert detection system includes a sensor unit having sensors like wheel speed sensor, rear sensor, front sensor and a tire pressure sensor, a controller and an alert indication unit. Further, as per one aspect of the present invention, the sensors are located to cover each side of the vehicle, for example, at least one front sensor in front side of the vehicle, at least one rear sensor in rear side of the vehicle, at least a wheel speed sensor mounted on a wheel disc plate to detect the speed of the vehicle and at least a tire pressure sensor for measuring an air pressure in the tire. Further, as per one aspect of the present invention, a DC power supply device provides power to the alert detection system provided in the vehicle. As per aspect of the present invention, the disclosed system provides alerts for different types of system, like collision warning system, high speed alert, roll over valve warning system and Lane departure warning system. The collision system includes forward collision warning system, rear collision warning system, Lane change alert system, Blind spot detection system. In the collision warning system, time to collision is calculated and is compared with the threshold value, based on which an alert is communicated to the rider. In high speed alert and roll over warning system, certain parameters like speed, tire pressure is measured and compared with the threshold value, based on which an alert is communicated to the rider. Further, for lane change, an image is captured by the camera and if the change in lane is captured, the alert is communicated to the rider. Thus the alert indication system and method as per the present invention helps in avoiding collision of the vehicle and thus protects the life of the rider. Also, with different levels of alerts issued and communicated to rider, rider gets an indication about the time available for the rider to take preventive measure. Thus, it avoids any collision of the vehicles Further, as per one aspect of present invention, the different levels of the alerts are Level 1; Level 2 and Level 3 are configured. The different levels of the alerts as communicated by the alert indication unit or system to the rider are Level 1, Level 2 and Level 3. The levels detect the risk associated with each level and communicate it to the rider in one or more means like an audio signal, a visual light signal, a visual display information etc. The level 1 is provided with an intensity A1 and frequency F1 and indicates mild/low risk to the rider wherein the intensity can be the intensity of the audio signal or the visual light indication etc. and the frequency can be the frequency of audio signal or flashing frequency of the visual light etc. Similarly, alert level 2 having amplitude A2 and frequency f2, indicates a moderate risk situation to the rider. Further, Level 3 is provided with intensity A3 and frequency F3 and communicates high risk to the rider. Further, with increasing levels of the alert, the intensity increases and the frequency decreases in order to achieve an effective alert to the rider. The levels of the alert indication unit ensure that the rider gets the correct nature of alert with the risk associated with it, so that rider can take precautionary measure to avoid any collision/accidents. Thereby this ensures the on road safety.

Further, as per one aspect of the present invention, the sensors disposed on the vehicle, senses the obstacle approaching the vehicle and hence sends signal to the controller. Further, the controller after receiving the output signal from the sensors computes and process the raw signals. Based on the processed raw signal, controller issues intensity and frequency of alert to the alert indication unit. The alert indication unit communicates the risk as an alert to the rider through suitable means. This configuration assists to protect the riders from accident, collision etc., thereby ensuring the safety of the riders.

The below paragraph further elaborates on the working of the alert detection system as per the present invention and the methodology used by the alert detection system for the forward and rear collision warning system. As per one aspect of the present invention, when the vehicle starts, a controller receives raw signal generated by the wheel speed sensor and the front and rear sensor of the vehicle. Subsequently, the controller analyzes the received raw signal from the sensors. Further, the controller process the distance & velocity signal of the obstacle/approaching vehicle received from the front & rear radar/lidar/camera sensor and the speed of the vehicle received from the vehicle wheel speed sensor and calculates time to collision. Time to collision is derived by relative distance (distance between the obstacle & the subject vehicle) divided by the relative velocity (difference between velocity of obstacle and velocity of vehicle),It then compares the detected value of time to collision of the obstacle with the threshold value of time to collision of the three levels of alerts. Subsequently, the controller determines whether the value of the time to collision T is more or less than the threshold value of the time to collision T1. If the controller determines that the detected value of the time to collision T of the vehicle is less than the threshold value of the time to collision of the alert of Level 1, i.e., T1 and T is more than T2, hence it activates the alert with intensity A1 and frequency f1, which means that the obstacle/approaching vehicle is a low/mild risk for the vehicle. Subsequently, the controller determines that whether the detected value of the time to collision T of the vehicle is less than the threshold value of the time to collision T2 and T is more than T3. If the controller determines that the time to collision T of the vehicle is less than the threshold value of the time to collision of the alert of Level 2, i.e., T2 and T is more than T3, hence, it activates the alert with intensity A2 and frequency f2 which means that the obstacle/vehicle is a moderate risk for the vehicle. Further, the controller determines whether the detected value of the time to collision T of the vehicle is less than the threshold value of the time to collision of the alert of Level 3, i.e., T3. If the controller determines that the time to collision of the subject vehicle is less than the threshold value of the time to collision of the alert of Level 3, i.e., T3, hence, it activates the alert with intensity A3 and frequency f3 which means that the obstacle/vehicle is a high risk for the subject vehicle. As per one aspect of the present invention, the T1 (time to collision) is greater than the T2 and T3. The time to collision T2 is greater than the T3 and smaller than the T1. The increase of the level is directly proportional to the intensity of the alert and inversely proportional to the frequency of the alert. With this relation, as the level increases, the intensity of the alert increases and frequency decreases. This provides the alert with high intensity to the rider and also, provides time gap to the rider to take appropriate measure/safety measure to avoid any collision with the approaching vehicle, thereby ensuring safety of the rider while riding the vehicle.

The below paragraph elaborates on the working of the alert detection system as per the present invention and the methodology used by the alert detection system for an approaching vehicle/obstacle in the blind spot area of the vehicle on different distances. Considering three distances D1, D2 and D3, for the approaching vehicle/obstacle located in the blind spot of the vehicle, where distance D3 is greater than both the distances that are D1 and D2. The distance D2 is smaller than D3. Further, when the vehicle starts, the rear sensor sends the signal to the controller about approaching vehicle/obstacle in blind spot area of the vehicle. The controller analyzes and calculates the distance D of the obstacle/approaching vehicle. Subsequently, controller compares the detected signal with the threshold safe distance value for the approaching vehicle/obstacle located in the blind spot. The threshold distance for the vehicle is denoted by D1, D2 and D3, where distance D1 is smaller than both the distances that are D2 and D3. The distance D2 is smaller than D3. Further, the controller determines that whether the threshold value of the alert is more or less than D3. If the controller determines that the distance D of the approaching vehicle/obstacle is more than the D3, then no alert is communicated to the rider. Further, the controller determines that whether the distance D of the approaching vehicle in a blind spot area of the vehicle is less than D3 and D is more than D2. If the controller determines that the distance of the approaching vehicle/obstacle is less than D3 and D is more than D2, the controller activates alert Level 1 having intensity A1 and frequency f1. Subsequently, if the above described condition is not fulfilled, then the controller further determines that whether the distance D of the approaching vehicle is less than D2 and D is more than D1. If controller determines that the distance of the approaching vehicle/obstacle D is less than D2 and D is more than D1, then the controller activate alert Level 2 having intensity A2 and frequency f2. The alert Level 2 communicates the rider about the moderate risk for the vehicle. Further, if controller determines that the above-mentioned conditions are not fulfilled, then the controller further determines that whether the distance D of the approaching vehicle is less than D1. If controller determines that the distance D of the approaching vehicle/obstacle is less than D1, then the controller activates alert Level 3 having intensity A3 and frequency f3. The alert Level 3 communicates the rider about the high risk for the vehicle. Hence, this system and described methodology ensures that the riders have sufficient time to take appropriate step to ensure his/her own safety.

The below paragraph elaborates on the working of the alert detection system as per the present invention and the methodology used by the alert detection system for the high alert speed warning system in the vehicle. As per one embodiment of the present invention, three speed levels S1, S2 and S3, where S1 is smaller than S2 and S3, are the threshold speed stored in the lookup table of the controller. Further, as the vehicle starts, the speed S of the vehicle is detected by the vehicle speed sensor. Further, the detected speed is fed into the controller as an input. The controller analyzes and compares the received speed signal. Subsequently, the controller determines whether the detected speed S is less than S1. If the controller determines that the detected speed S is less than S1, then, the controller activates no alert. Further, the controller determines that whether the detected speed S is more than S1 and S is less than S2. If the controller determines that the detected speed is more than S1 and S is less than S2, then, the controller activates alert Level 1 having intensity A1 and frequency f1. Hence, the alert indication unit communicates low risk to the rider related to speed of the vehicle. Further, the controller determines that whether the detected speed S is more than S2 and S is less than S3. If the controller determines that the detected speed S is more than S2 and is less than S3, then, the controller activates alert Level 2 having intensity A2 and frequency f2. Further, the controller determines that whether the detected speed S is more than S3. If the controller determines that the detected speed is more than S3, then, the controller activates alert Level 3 having intensity A3 and frequency f3. Hence, the alert indication unit communicates high risk to the rider related to speed of the vehicle. Hence, this system and described methodology enables the rider to know about the high speed of the vehicle and thus enables the rider to take safety measures to slow down the vehicle which ultimately ensures the on road safety of the vehicle As per one aspect of the present invention, the below mentioned paragraph elaborates on the working of the alert detection system as per the present invention and the methodology used by the alert detection system for the tire pressure warning system. As per one aspect of the present invention, the controller has a threshold value, P1, P2 and P3 stored in the look up table. Further, as per one aspect of the present invention, the tire pressure sensor sends the output signal to the controller. The controller analyzes the received signal. The controller further determines that whether the pressure of the tire P is more or less than P1. If the controller determines that the pressure of the tire P of the vehicle is more than P1, no alert is issued by the controller. Further, if the controller determines that the pressure of the tire P is less than P1, the controller activates alert Level 1 having intensity A1 and frequency f1. Hence, the alert indication unit communicates mild/low risk to the rider. Subsequently, controller determines whether the pressure of the tire P is less than P2 and more than P3. If the controller determines that the pressure P of the tire is less than P2, and P is more than P3, then the controller activates alert Level 2 having intensity A2 and frequency f2. Hence, the alert indication unit communicates moderate risk to the rider. The controller further determines that whether the pressure P of the tire is less than P3. If the controller determines that the pressure P of the tire is less than P3, the controller activates then the controller activates alert Level 3 having intensity A3 and frequency f3. Hence, the alert indication unit communicates high risk to the rider. Hence, this system and described methodology ensures that the riders have sufficient time to take appropriate step to ensure his/her own safety.

As per one aspect of the present invention, the below mentioned paragraph elaborates on the working of the alert detection system as per the present invention and the methodology used by the alert detection system for the rear collision warning system with plurality of alert indication. After starting of the vehicle, rear radar sensor sends the output signal of the approaching vehicle/obstacle. The controller analyzes the signal and compares it with the predetermined signal stored in the look up table of the controller. Further, the controller determines that whether the vehicle is approaching rear side of the vehicle to the left side of the vehicle. Subsequently, the controller determines that whether the left turn signal of the vehicle is ON. If the controller determines that the vehicle is approaching from the left side of the vehicle and the left turn signal of the vehicle is ON. Then the controller activates an alert that is a haptic alert. If the controller determines that the vehicle is approaching from the left side of the vehicle and the left turn signal of the vehicle is OFF, the controller activates visual alert in the vehicle.

Further, as per another aspect of the present invention, the controller determines that whether the vehicle is approaching rear side of the vehicle to the right side of the vehicle. Subsequently, the controller determines that whether the right turn signal of the vehicle is ON. If the controller determines that the vehicle is approaching from the right side of the vehicle and the right turn signal of the vehicle is ON. Then the controller activates an alert that is a haptic alert. If the controller finds out that the vehicle is approaching from the right side of the vehicle and the right turn signal of the vehicle is OFF, the controller activates visual alert in the vehicle. Thus, the multi-level communication of the alert to the rider helps the rider to analyses the risk level associated, the speed of the vehicle etc. This ensures the safety of the rider while riding the vehicle.

As per one aspect of the present invention, the alert indication unit can be of various types like as, visual alert, haptic alert or an audio alert. In visual alert, alert is communicated to the rider through the plurality of LEDs mounted on the vehicle. In haptic alert, alert is communicated through the vibration and frequency of the actuators. In audio alert, alert is generated by the sound intensity. This provides the rider ease of identification of the alert at differentiated level in the vehicle.

In the ensuing exemplary aspects, the vehicle is a two wheeled saddle type vehicle. However, it is contemplated that the concepts of the present invention may be applied to any of the two wheeled, three wheeled and four wheeled type vehicle.

The various other features of the invention are described in detail below with an embodiment of a two wheeled vehicle with reference to the accompanying drawings. In the drawings, like reference numbers generally indicate identical, functionally similar, and/or structurally similar elements. The drawing in which an element first appears is indicated by the leftmost digit(s) in the corresponding reference number. With reference to the accompanying drawings, wherein the same reference numerals will be used to identify the same or similar elements throughout the several views.

The present subject matter is further described with reference to accompanying figures. It should be noted that the description and figures merely illustrate principles of the present subject matter. Various arrangements may be devised that, although not explicitly described or shown herein, encompass the principles of the present subject matter. Moreover, all statements herein reciting principles, aspects, and examples of the present subject matter, as well as specific examples thereof, are intended to encompass equivalents thereof.

Further "front" and "rear", and "left" and "right" referred to in the ensuring description of the illustrated embodiment refer to front and rear, and left and right directions as seen in a state of being seated on a seat of the saddle type vehicle. Furthermore, a longitudinal axis refers to a front to rear axis relative to the vehicle, while a lateral axis refers to a side to side, or left to right axis relative to the vehicle. Also, it is to be understood that the phraseology and terminology used herein is for the purpose of description and should not be regarded as limiting.

FIG. 1 is a right side view of an exemplary saddle type vehicle. The vehicle (100) has a frame assembly (not shown), which acts as the skeleton for bearing the loads. Instrument cluster (119) is mounted on handle bar assembly (126). The handle bar assembly (126) is disposed over the head tube (not shown) and it includes brake levers (not shown). The handle bar assembly (126) is connected to a front wheel (129) by one or more front suspension(s) (130). A front fender (131) is disposed above the front wheel (129) for covering at least a portion of the front wheel (129). A fuel tank (103) is mounted to the main tube (not shown) of the frame (not shown) and it is disposed in the front portion F of a space of the frame (not shown). The vehicle (100) having lighting means which includes Head lamp (127), Tail lamp (not shown), Turning indicators includes front side indicators (not shown) and rear side indicator (not shown) respectively. A rear fender (138) is projected outwardly of the vehicle systems and protects pillion from mud splash as well as to protect the rear wheel (133) from external components. A power unit (125) is mounted to the lower portion of the vehicle (100). In an embodiment, the power unit (125) is an IC engine. The fuel tank (103) is functionally connected to the engine (125). The seat (132) is located at the back region of the fuel tank (103) and is extended in a longitudinal direction along the seat frames. As per one embodiment of the present invention, an exhaust system (127) is connected to the engine (125) and extended rearwardly of the vehicle (100).

Figure 2:
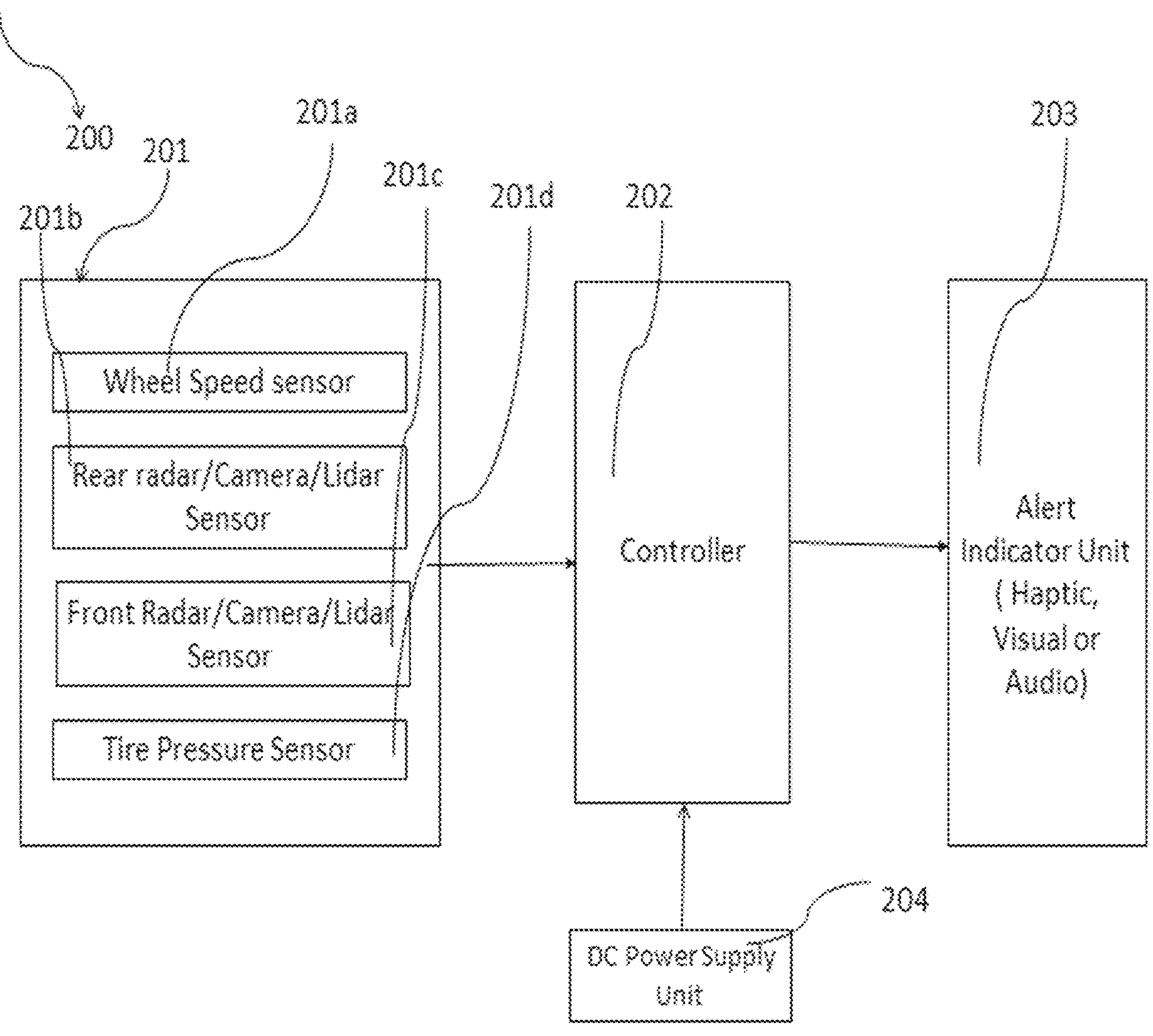
FIG. 2 is a block diagram for an alert detection system as per one embodiment of the present invention

FIG. 2 is a block diagram for an alert detection system as per one embodiment of the present invention. The alert detection system (200) includes at least a sensor unit (201) having sensors (201*a*, 201*b*, 201*c* and 201*d*), a controller (202) and an alert indication unit (203). The alert indication unit (203) includes a haptic alert unit, visual alert unit and audio alert unit. Further, as per one embodiment of the present invention, the sensors as disposed on the vehicle, senses the obstacle approaching the vehicle and hence sends signal to the controller. Further, the controller after receiving the output signal from the sensors computes and processes at least one or more input signal received from at least a sensor unit (201). Based on the processed signal, controller determines one or more output indicators based at least on one or more input signals. The one or more output indicators includes a first output indicator, a second output indicator and a third output indicator, where the output indicators are progressively enabled based on the received input signal.

Figure 2A:
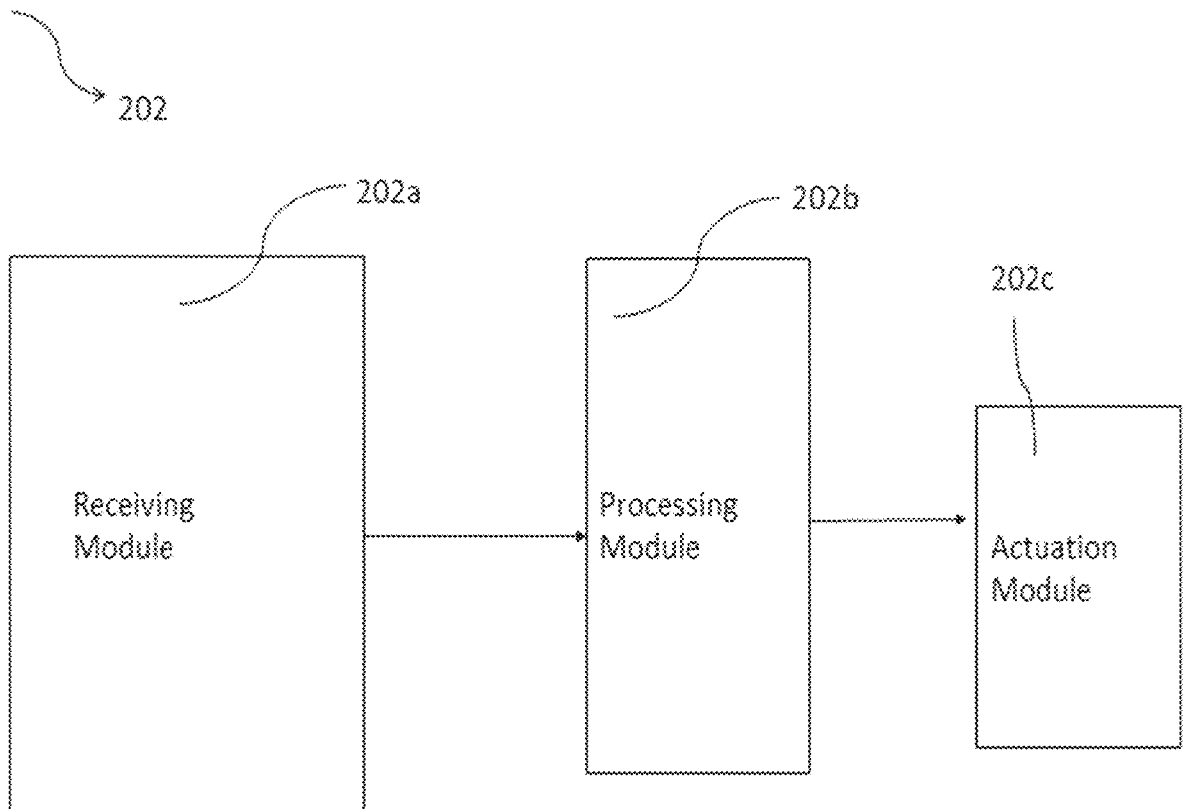
FIG. 2*a* is a module of controller as per one embodiment of the present invention.

Elaborating further, the controller (202) is designed with three modules, namely receiving module (202*a*), processing module (202*b*) and actuation module (202*c*) (as shown in FIG. 2*a*). The receiving module (202*a*) of the controller receives at least one or more input signal from at least a sensor unit (201). Further, the processing module (202*b*) determines one or more output indicators based at least on one or more input signals. The one or more output indicators includes a first output indicator, a second output indicator and a third output indicator which are the different levels of alert, i.e., Level 1 alert, Level 2 alert and Level 3 alert, as activated by the controller, where the output indicators are progressively enabled based on the received input signal. Further, the actuation module (202*c*) actuates and communicates selected output indicator from the one or more output indicators by suitable means for example, through alert indication unit having one or more alert indicators to the rider. This ensures the timely communication of alert to rider.

Figure 2B:
FIG. 2*b* is a side view of the vehicle with sensors as per one embodiment of the present invention.
Figure 2B:
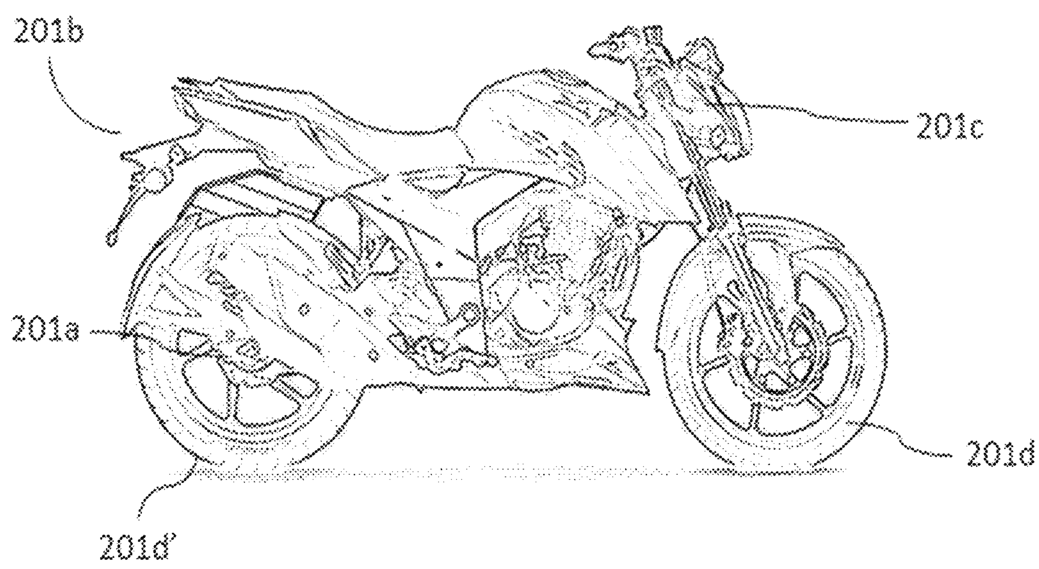

Further, as per one embodiment of the present invention, the sensors (201*a*, 201*b*, 201*c*, and 201*d*) are located to detect signals of the vehicle and approaching vehicle/obstacle in different situations of the vehicle. For example, at least one front sensor (201*c*) in front side (F) of the vehicle, i.e. in one implementation it can be a radar sensor located above headlamp of the vehicle. In another implementation it can be located above the front wheel and there should not be any obstruction with the metallic part and the sensor can be camera or lidar sensor. The front sensor (201*c*) measures distance and relative velocity of the obstacle approaching from the front side of the vehicle. Further, at least one rear sensor (201*b*) is mounted in rear side (R) of the vehicle. The rear sensor measures the distance and velocity of the vehicle approaching from the rear and entering into blind spot area of the vehicle. In an implementation, the rear sensor is located above the license plate bracket. As per one embodiment, the rear sensor is a radar sensor. In another embodiment, the rear sensor is a camera or lidar sensor. Further, at least a wheel speed sensor (201*a*) mounted on a wheel disc plate to detect the speed of the vehicle and at least a tire pressure sensor (201*d*) for measuring an air pressure in the tire (as shown in FIG. 2*b*). Further, as per one embodiment of the present invention, a DC power supply (204) device provides power to the alert detection system provided in the vehicle. As per one embodiment of the present invention, the disclosed system provides alert for different types of system, like collision warning system, high speed alert, roll over valve warning system and Lane departure warning system. The collision system includes forward collision warning system, rear collision warning system, Lane change alert system, Blind spot detection system. In the collision warning system, time to collision is calculated and is compared with the threshold value, based on which an alert is communicated to the rider. In high speed alert and roll over warning system, one or more parameters like speed, tire pressure are measured and compared with the threshold value, based on which an alert is communicated to the rider. Further, for lane change, an image is captured by the camera and if the change in lane is captured, the alert is communicated to the rider. All method described help in avoiding collision of the vehicle, alerts the rider about the high speed of the vehicle and thus protects the life of the rider. Also, with different levels of alerts issued and communicated to rider, rider gets an indication about the time available for the rider to take preventive measure. Thus, it avoids any collision of the vehicles and ensures the safety of the riders and the fellow passengers.

Figure 2C:
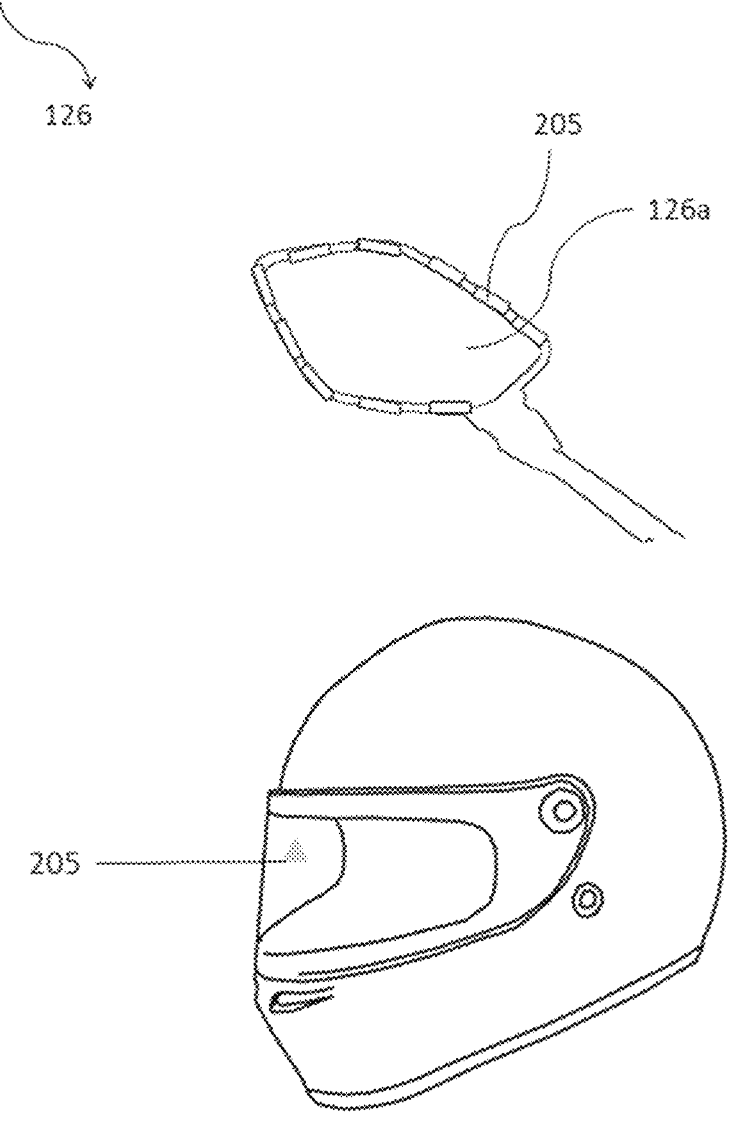
FIG. 2*c* is a view of helmet and rear mirror having LEDs as per one embodiment of the present invention.
Figure 2D:
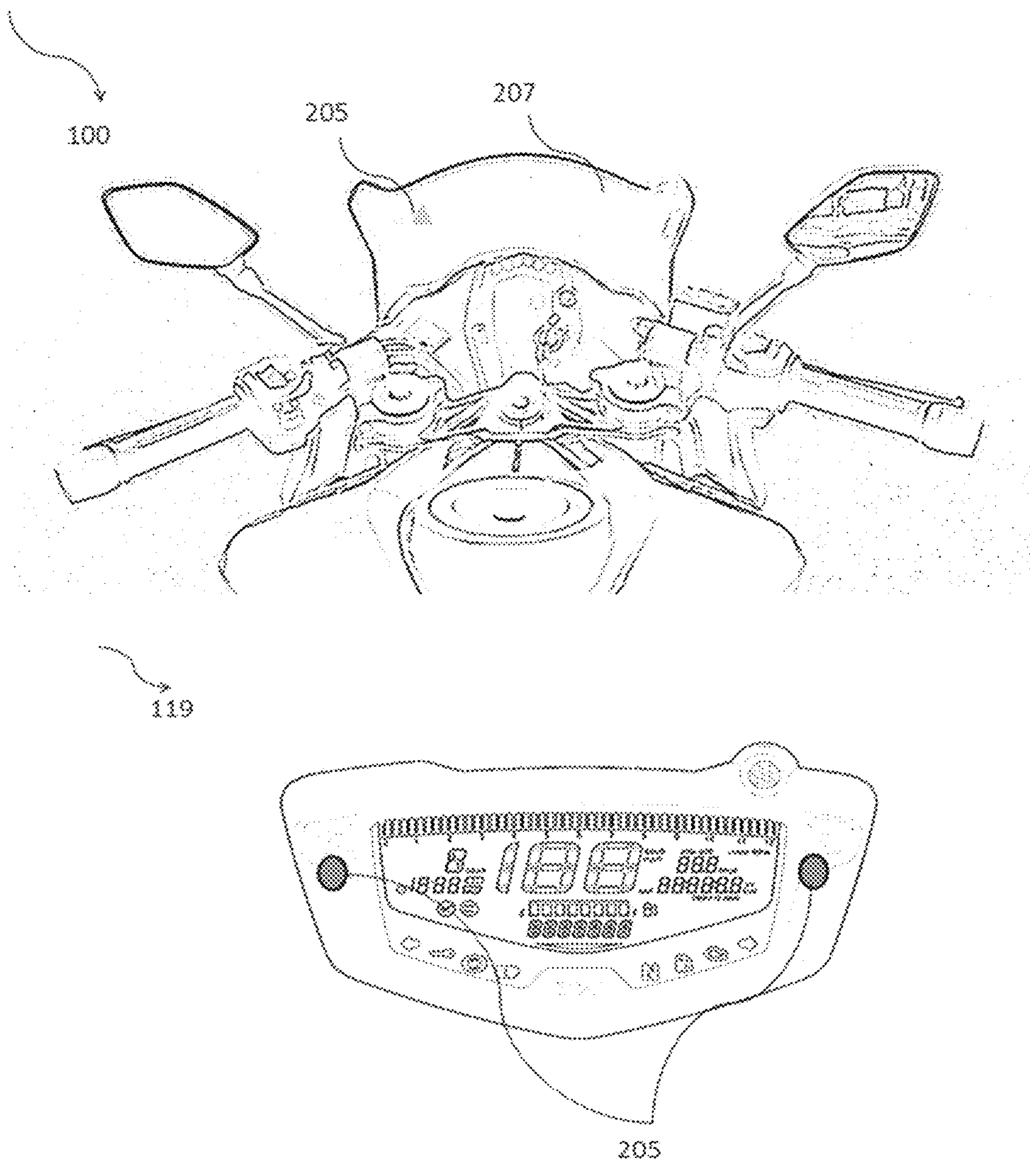
FIG. 2*d* is a view of visor and instrument cluster of the vehicle as per one embodiment of the present invention.
Figure 2E:
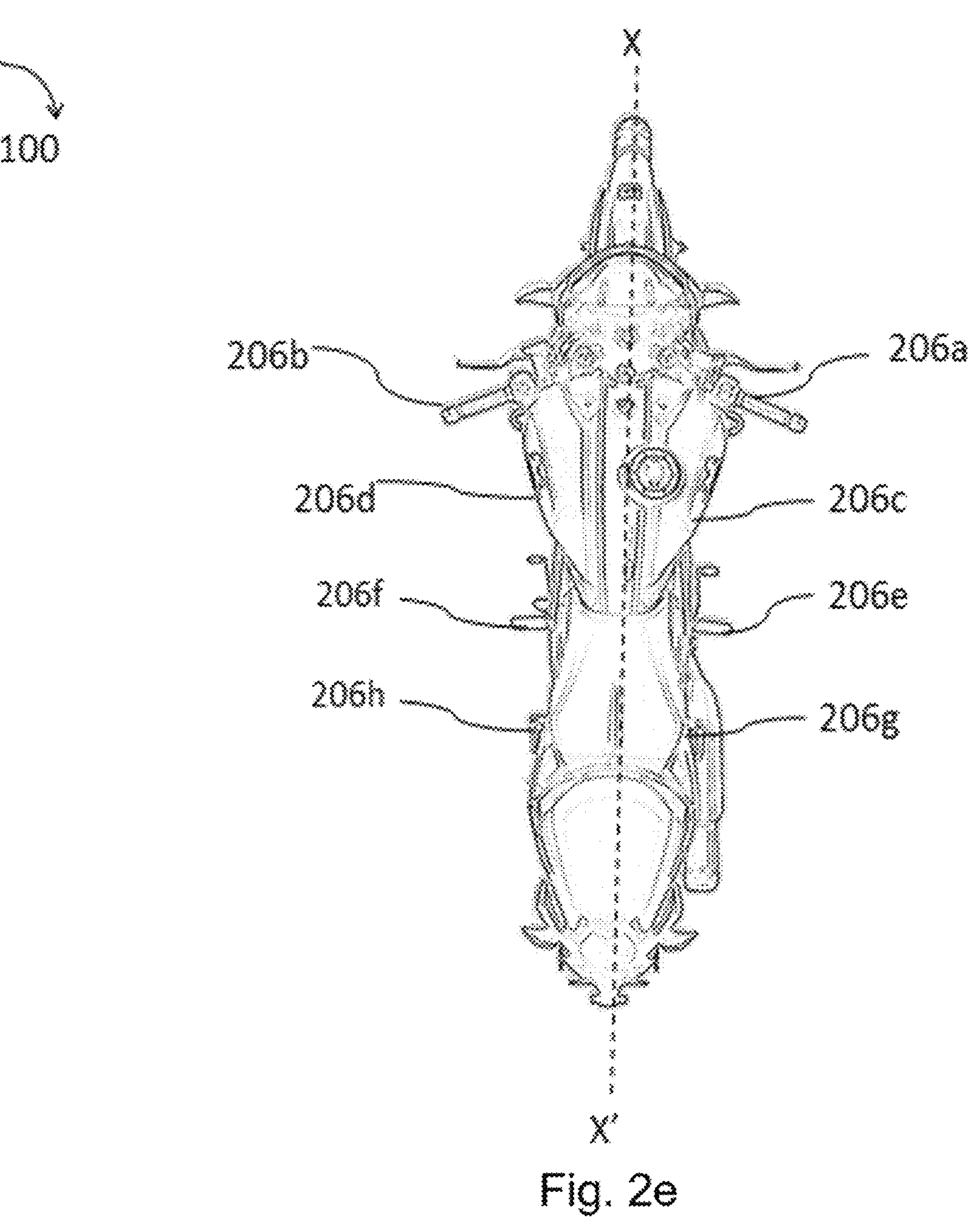
FIG. 2*e* is top view of the vehicle having haptic alert indicator as per one embodiment of the present invention.

Further, as per one embodiment of the present invention, the alarm indication unit (203) includes one or more types of alert indicators that are; visual alert indicators, haptic alert indicators and audio alert indicators. As the outputs of the alert systems are different, so they require different channels/mediums to communicate it to the rider. For reference, visual alert alert's output's intensity is light intensity of a group of light devices e.g. LEDs and frequency of the alert is the frequency of the LEDs. Hence, for communicating visual alerts to the rider, the groups of LEDs as a visual alert indicator (205) are located on the rear view mirror (126*a*). As per another embodiment, the visual alert indicator (205) is located on the helmet visor, visor (207) of the vehicle, or sides of the instrument cluster (119) (as shown in FIGS. 2*c* and 2*d*) or any other indication means like a mobile phone which is located on the handle bar of the vehicle with a mobile holder. The mobile holder has plurality of arms where one arm is fixed with base of the mobile phone and another arm is a moving arm which if further connected to the compression spring. This ensures that the visual alert indicators are in the range of the vision of sight of the rider. The visual alert indicator communicates low/mild risk to the rider. This enables the rider to take effective step to protect the vehicle from any accidents. The haptic alert system's output intensity is the vibration strength of the haptic actuator and the frequency is ON and OFF frequency of the haptic actuator. In one implementation haptic alert indicators (206*a*, 206*b*) are located on the handle bar of the vehicle. In another implementation, the haptic alert indicators (206*c*, 206*d*, 206*e*, 206*f*, 206*g*) are located on either side of the vehicle with respect to longitudinal mid plane axis (XX') of the vehicle, near the fuel tank, rider's foot pegs and rider's seat on the vehicle (as shown in FIG. 2*e*). The location configured of the haptic alert indicators as per the present invention ensure that the indicators do not experience any undesirable disturbance with the vibrations from the power unit, thus the rider will be able to feel the alert communicated by the haptic alert unit. Further, in one implementation, the audio alert indicator is located inside the rider's helmet and in another implementation, the audio alert indicator can be located around the fuel tank assembly, instrument cluster etc. in the vehicle where the rider can differentiate the alert audio with the surrounding noise, power unit noise etc. The audio and haptic alert is used to communicate the rider about moderate and high risk. This enables the rider to take precautionary measure to avoid any accidents/collision, thereby ensuring the safety of the rider.

Figure 2F:
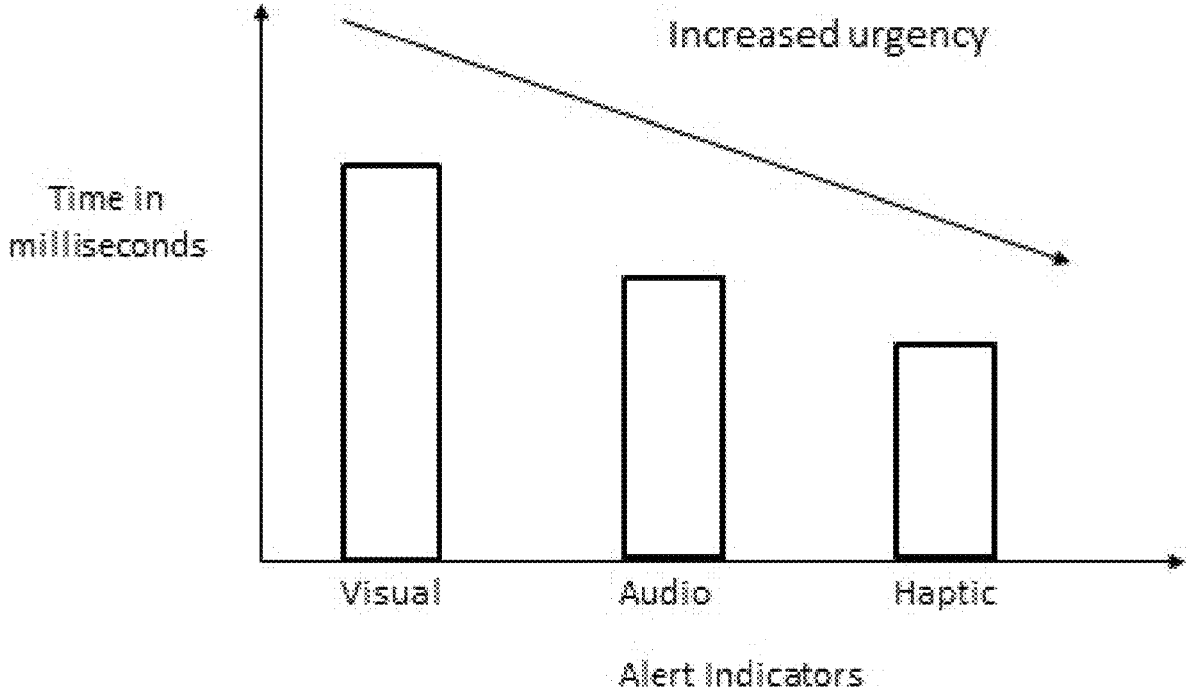
FIG. 2*f* is a graph for alert indicators as per one embodiment of the present invention.

Also, the selection of the one or more alert indicators of the alert indicator unit depends on the reaction time of the rider (as shown in FIG. 2*f*).The reduced reaction time is directly proportional to the increased level of risk in the vehicle. The haptic alert indicator has the lowest reaction time, followed by audio alert indicator and visual alert indicator. Therefore, the one or more alert indicators are configured to communicate different levels of risk to the rider such that the alerts are in intentionally aligned to the natural reaction time of a human being in order of urgency of the risk i.e. visual and audio alerts for low and medium risk and haptic alert for high risk scenarios. Hence, this provides the rider sufficient time to take the precautionary measures to avoid any collision, accidents etc.

Figure 3:
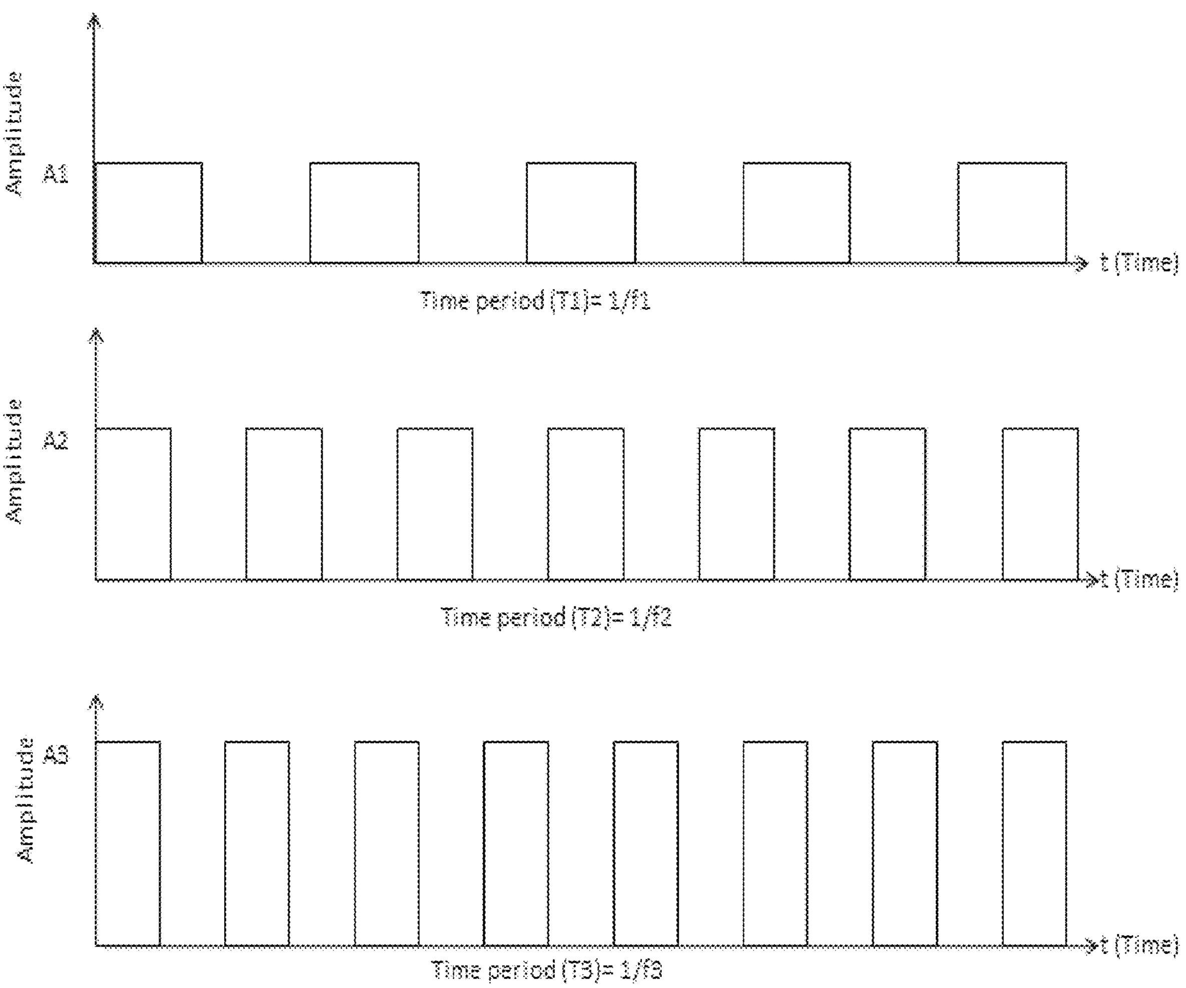
FIG. 3 is a graphical representation having various amplitude and frequency as per one embodiment of the present invention.

FIG. 3 represents different levels of the alert indication unit having amplitude and frequency as per one embodiment of the present invention. The different levels of the alerts are Level 1, Level 2 and Level 3. The level 1 is provided with intensity A1 and frequency F1 and indicates mild/low risk to the rider wherein the intensity can be the intensity of the audio signal or the visual light indication etc. and the frequency can be the frequency of audio signal or flashing frequency of the visual light etc. Similarly, alert level 2 having amplitude A2 and frequency f2, indicates a moderate risk situation to the rider. Further, level 3, is provided with intensity A3 and frequency f3 and communicates high risk to the rider. Further, with increasing levels of the alert, the intensity increases and the frequency decreases in order to achieve an effective alert to the rider. The levels of the alert indication unit ensure that the rider gets the correct nature of alert with the risk associated with it, so that rider can take precautionary measure to avoid any collision/accidents. Thereby this ensures on road safety. Also, these levels of alert as explained above mentioned are integral part of various kind warning systems like forward collision warning system, rear collision warning system, high speed warning system etc. which communicate the risk associated with each level of the alerts. Hence, this enables rider to assess the danger, take precautionary steps and also ensures on road safety. Further, the below mentioned paragraph explains about the methodology of the different warning systems along with the alert levels to communicate the associated risk/danger to the rider.

Figure 4:
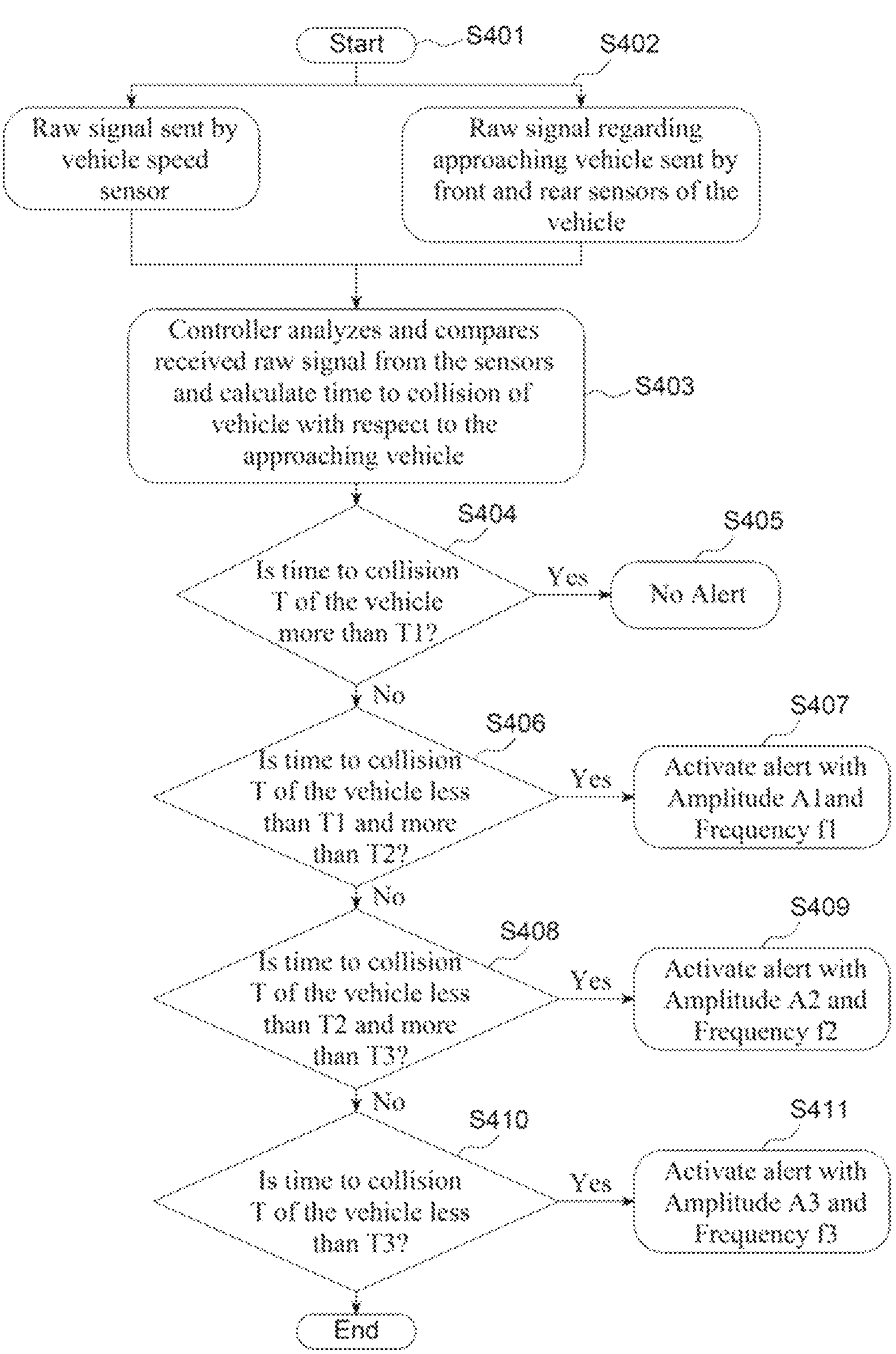
FIG. 4 is a flowchart for the forward and rear collision system as per one embodiment of the present invention.

FIG. 4 is a flowchart for the forward and rear collision warning system as per one embodiment of the present invention. As per one embodiment of the present invention, alert detection system has a controller which is configured with a receiving module, a processing module and an actuation module. At (S401) the vehicle starts, at (S402) the receiving module of the controller receives raw signal generated by the wheel speed sensor regarding the speed of the vehicle and the front and rear sensor regarding the approaching vehicle/obstacle. Subsequently, at S403, the controller analyzes the received raw signal from the sensors. In this step, the processing module of the controller process the distance & velocity signal of the obstacle/approaching vehicle received from the front & rear radar/lidar/camera sensor and the speed of the vehicle received from the vehicle wheel speed sensor and calculates time to collision of the vehicle with respect to the approaching vehicle/obstacle. Time to collision is derived by relative distance (distance between the obstacle & the subject vehicle) divided by the relative velocity (difference between velocity of obstacle & velocity of vehicle). It then compares the detected value of time to collision of the obstacle with the threshold value of time to collision of the three levels of alerts. Subsequently, at S404, the controller determines whether the value of the detected time to collision T of vehicle is more or less than the threshold value of the time to collision T1. If the controller finds out that the detected value of the time to collision T of the vehicle is more than the threshold value of the time to collision of the alert of Level 1, i.e., T1, hence, at S405, it activates no alert to the rider. Further, If the controller determines that the detected value of the time to collision T of the vehicle is less than the threshold value of the time to collision of the alert of Level 1, i.e., T1 and T is more than T2, hence, at S407, it activates the alert with intensity A1 and frequency f1, which means that the obstacle/approaching vehicle is a low/mild risk for the vehicle. Subsequently, at S408, the controller determines that whether the detected value of the time to collision T of the vehicle is less than the threshold value of the time to collision T2 and T is more than T3. If the controller determines that the detected value of the time to collision T of the vehicle is less than the threshold value of the time to collision of the alert of Level 2, i.e., T2 and T is more than T3, hence, at S409, it activates the alert with intensity A2 and frequency f2 which means that the obstacle/vehicle is a moderate risk for the vehicle. At S408, the controller determines whether the detected value of the time to collision T of the vehicle is less than the threshold value of the time to collision of the alert of Level 3, i.e., T3. If the controller determines that the time to collision T of the vehicle is less than the threshold value of the time to collision of the alert of Level 3, i.e., T3, hence, at S409, it activates the alert with intensity A3 and frequency f3 which means that the obstacle/vehicle is a high risk for the vehicle. As per one embodiment of the present invention, the T1 (time to collision) is greater than the T2 and T3. The time to collision T2 is greater than the T3 and smaller than the T1. The increasing level of alert is directly proportional to the intensity of the alert and inversely proportional to the frequency of the alert. The decreasing time to collision interprets the alert with higher risk in the vehicle and so on. With this relation, as the level increases, the intensity of the alert increases and frequency decreases. This provides the alert with high intensity to the rider and also, provides time gap to the rider to take appropriate measure/safety measure to avoid any collision with the approaching vehicle, thereby ensures safety of the rider while riding the vehicle.

Further, as per one embodiment of the present invention, the alert levels as activated by the controller is communicated to the rider through one or more suitable means like visual alert indicator, haptic alert indicator or audio alert indicator. The visual alert indicator indicates the alert when the risk level is low. The haptic alert and audio alert indicators indicates the alert to the rider when the risk level is moderate or high. Hence, this enables the rider to differentiate the level of alert generated and risk associated with it. Therefore, this enables the rider to take appropriate measure/safety measure to avoid any kind of collision and ensures road safety.

Figure 5:
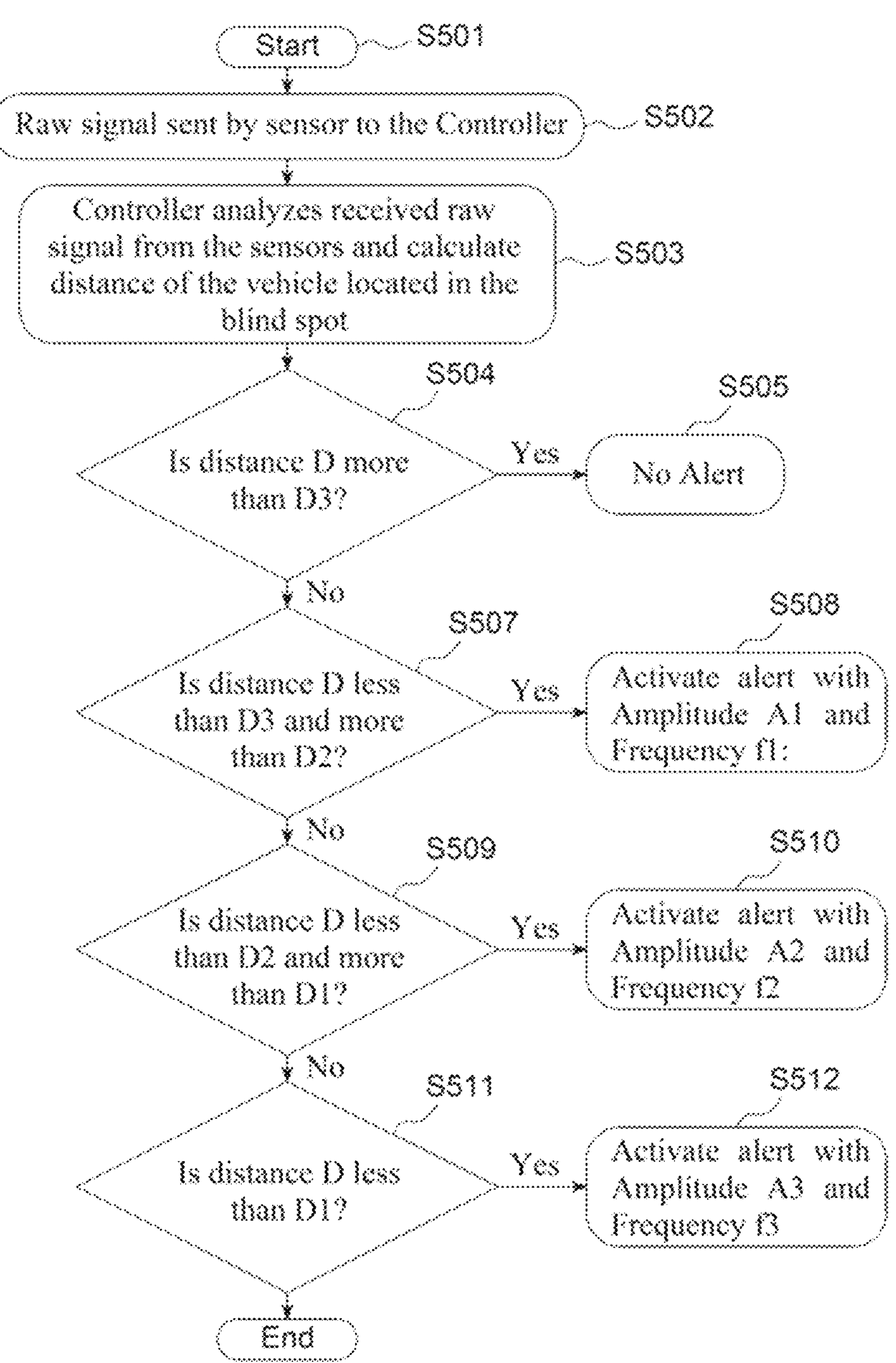
FIG. 5 is a flowchart for an approaching vehicle/obstacle in the blind spot area of the vehicle on different distances as per one embodiment of the present invention.

FIG. 5 is a flowchart for an approaching vehicle/obstacle in the blind spot area of the vehicle on different distances as per one embodiment of the present invention. Considering three distances D1, D2 and D3, for the approaching vehicle/obstacle located in the blind spot area of the vehicle, where distance D1 is smaller than both the distances that are D2 and D3. The distance D2 is smaller than D3. Further, at S501, when the vehicle starts, at S502, the rear sensor sends the signal to the controller about approaching vehicle/obstacle in blind spot are of the vehicle. At S503, the controller analyzes and calculates the distance D of the obstacle/approaching vehicle. Subsequently, controller compares the detected signal of the distance D for the approaching vehicle/obstacle located in the blind spot area with the threshold safe distance value stored in the look up table of the controller. The threshold distance for the vehicle is denoted by D1, D2 and D3, where distance D1 is smaller than both the distances that are D2 and D3. The distance D2 is smaller than D3. Further, at S504, the controller determines that whether the threshold value of the alert is more or less than D3. If the controller determines that the distance D of the approaching vehicle/obstacle is more than the D3 as stored in the lookup table of the controller, then no alert is communicated to the rider. Further, at S507, the controller determines that whether the distance D of the approaching vehicle in a blind spot area of the vehicle is less than D3 and D is more than D2. If the controller determines that the distance D of the approaching vehicle/obstacle is less than D3 and is more than D2, then, at S508, the controller activates alert Level 1 having intensity A1 and frequency f1 and communicates it to the alert indication unit. The alert indication unit further communicates the alert level 1 with a visual alert indicator to the rider. Subsequently, if the above described condition is not fulfilled, then, at S509 the controller further determines that whether the distance D of the approaching vehicle is less than D2 and D is more than D1. If controller finds out that the distance D of the approaching vehicle/obstacle is less than D2 and is more than D1, then at S510, the controller activates alert Level 2 having intensity A2 and frequency f2. The alert Level 2 communicates the rider about the moderate risk for the vehicle. Further, if controller finds out that the above mentioned conditions are not fulfilled, then the controller further determines that whether the distance D of the approaching vehicle is less than D1. If controller determines that the distance D of the approaching vehicle/obstacle is less than D1, then the controller activates alert Level 1 having intensity A1 and frequency f1. The alert Level 1 communicates the rider about the high risk for the vehicle. Hence, this system and described methodology ensures that the riders have sufficient time to take appropriate step to ensure his/her own safety. This provides the alert with high intensity to the rider and also, provides time gap to the rider to take appropriate measure/safety measure to avoid any collision with the approaching vehicle in the blind spot area of the vehicle, thereby ensures safety of the rider while riding the vehicle.

Further, as per one embodiment of the present invention, the alert levels as activated by the controller is communicated to the rider through one or more suitable means like visual alert indicator, haptic alert indicator or audio alert indicator. The visual alert indicator indicates the alert when the risk level is low. The haptic alert and audio alert indicators indicates the alert to the rider when the risk level is moderate or high. Hence, this enables the rider to differentiate the level of alert generated and risk associated with it. Therefore, this enables the rider to take appropriate measure/safety measure to avoid any kind of collision and ensures road safety.

Figure 6:
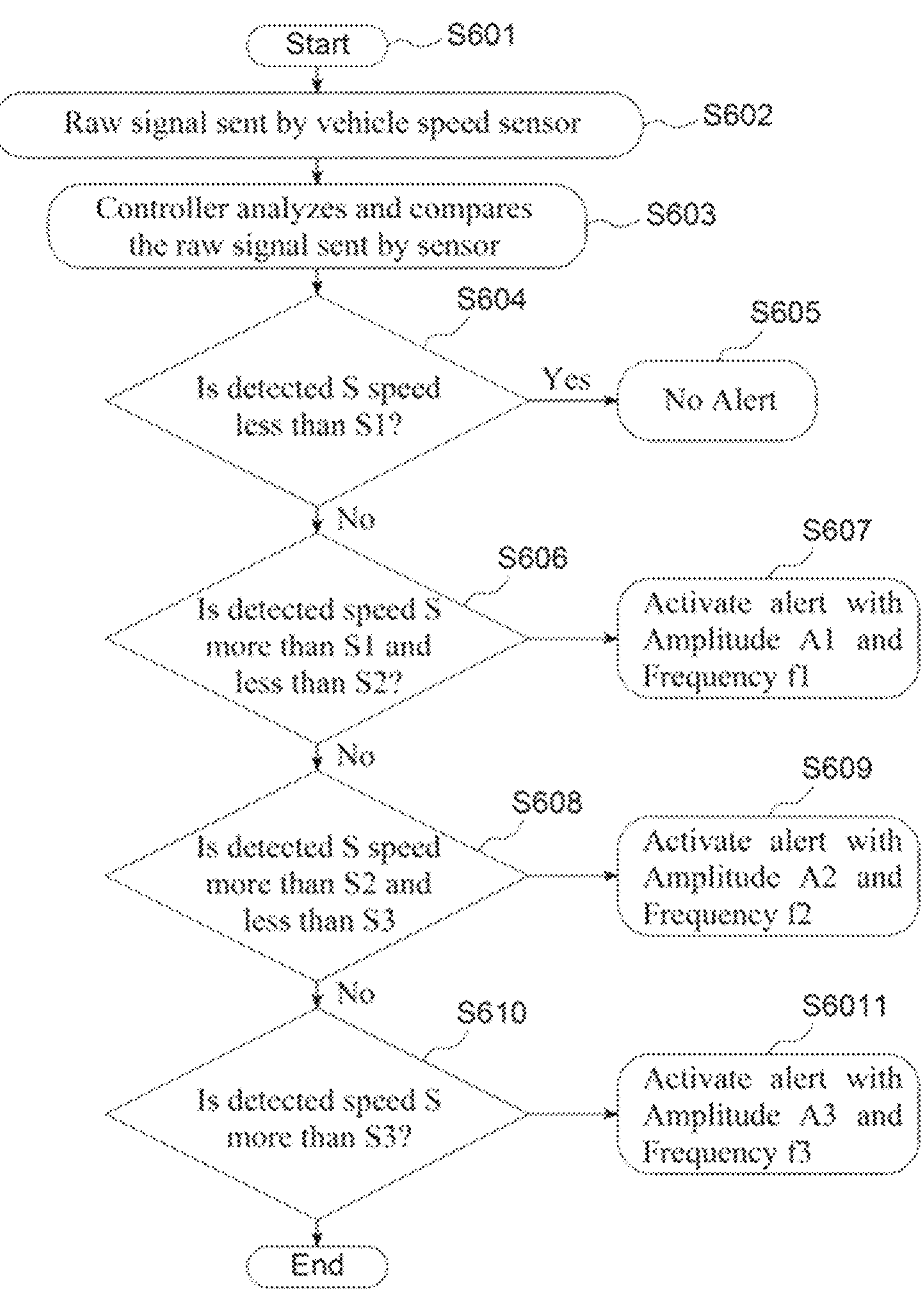
FIG. 6 is a flowchart for the high alert speed warning system in the vehicle as per one embodiment of the present invention.
Figure 7:
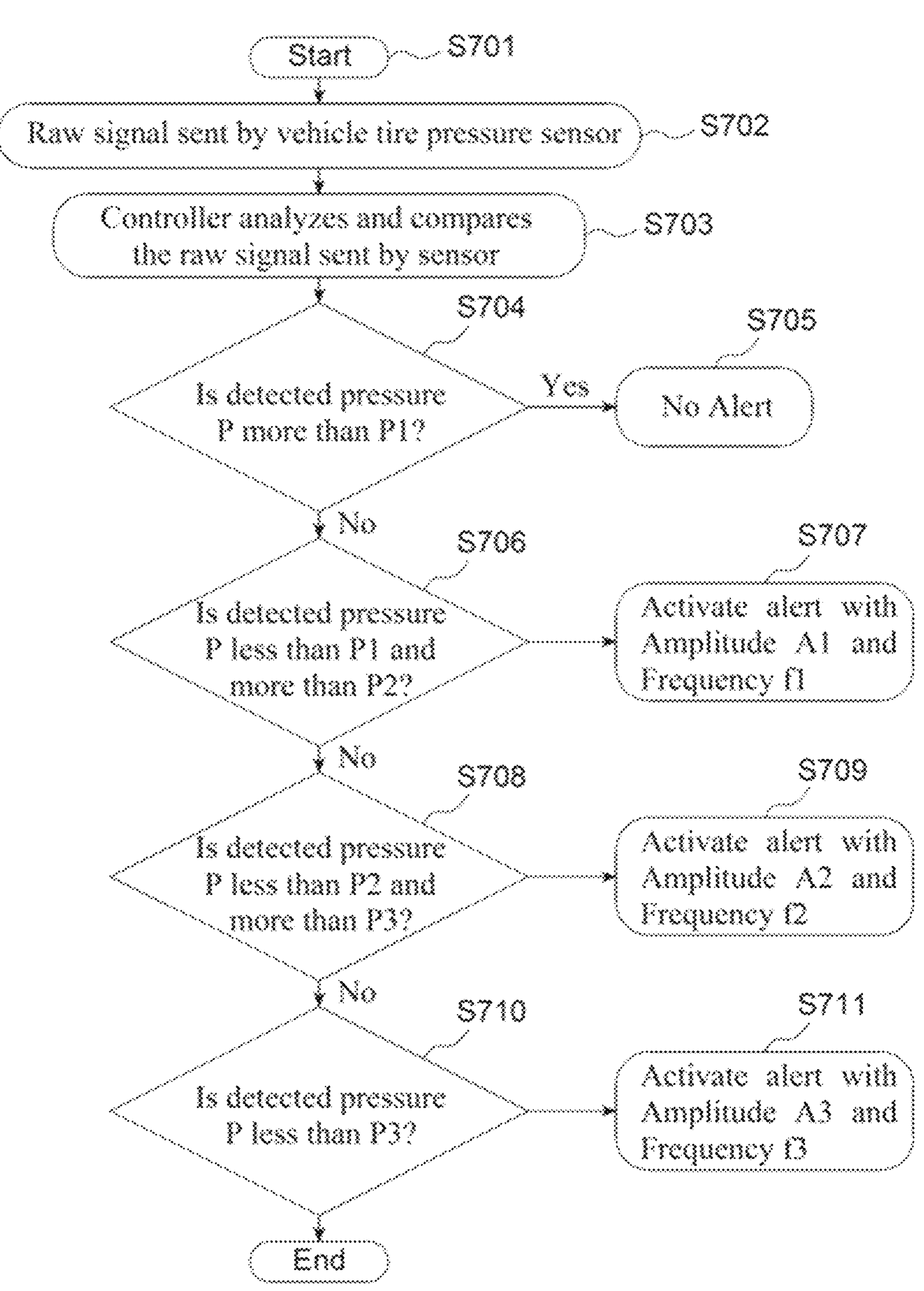
FIG. 7 is a flowchart for the tire pressure warning system as per one embodiment of the present invention.

FIG. 6 is a flowchart for the high speed warning system in the vehicle as per one embodiment of the present invention. As per one embodiment of the present invention, three speed levels S1, S2 and S3, where S1 is smaller than S2 and S3, are the threshold speed stored in the lookup table of the controller. Further, as the vehicle starts, S601, the speed of the vehicle is detected by the vehicle speed sensor. At S602, the detected speed S is fed into the controller as an input. Further, at S603, the controller analyzes and compares the received speed signal. Subsequently, at S604, the controller determines whether the detected speed S is less than S1. If the controller determines that the detected speed S is less than S1, then, at S605, the controller activates the controller activates no alert. Further, at S606, the controller determines that whether the detected speed S is more than S1 and S is less than S2. If the controller determines that the detected speed S is more than S1 and is less than S2, then, at S607, the controller activates alert Level 1 having intensity A1 and frequency f1. Hence, the alert indication unit communicates low risk to the rider related to speed of the vehicle. Subsequently, at S608, the controller determines that whether the detected speed S is more than S2 and S is less than S3. If the controller determines that the detected speed S is more than S2 and less than S3, then, at S609, the controller activates alert Level 2 having intensity A2 and frequency f2. Hence, the alert indication unit communicates moderate risk to the rider related to speed of the vehicle. Further, the controller determines that whether the detected speed S is more than S3. If the controller determines that the detected speed S is more than S3, then, the controller activates alert Level 3 having intensity A3 and frequency f3. Hence, the alert indication unit communicates high risk to the rider related to speed of the vehicle. Hence, this system and described methodology enables the rider to know about the high speed of the vehicle and thus enables the rider to take safety measures to slow down the vehicle which ultimately ensures the on road safety of the vehicle FIG. 7 is a flowchart for the tire pressure warning system. As per one embodiment of the present invention, the controller has a threshold value, P1, P2 and P3 stored in the look up table. Further, as per one embodiment of the present invention, at S702, the tire pressure sensor sends the output signal to the controller. At S703, the controller analyzes the received signal. At S704, the controller further determines that whether the pressure P of the tire is more or less than P1. At S705, if the controller determines that the pressure P of the tire of the vehicle is more than P1, no alert is issued by the controller. Further, at S706, if the controller determines that the pressure P of the tire is less than P1 and more than P2, then at S707, the controller activates alert Level 1 having intensity A1 and frequency f1. Hence, the alert indication unit communicates mild/low risk to the rider. Subsequently, at S708, the controller determines whether the pressure P of the tire is less than P2 and more than P3. If the controller determines that the pressure P of the tire is less than P2 and more than P3, then, at S709, the controller activates alert Level 2 having intensity A2 and frequency f2. Hence, the alert indication unit communicates moderate risk to the rider. At S710, the controller further determines that whether the pressure P of the tire is less than P3. If the controller determines that the pressure P of the tire is less than P3, then at S711, the controller activates then alert Level 3 having intensity A3 and frequency f3. Hence, the alert indication unit communicates high risk to the rider. Hence, this system and described methodology ensures that the riders have sufficient time to take appropriate step to ensure his/her own safety.

Therefore, summing up the methodology for the different warning systems. The receiving module of the controller receives at least one or more input signals from the sensors as located in the vehicle. The processing module compares and determines the received input signal with respect to the threshold value stored in the look up table of the controller. Based on the comparison and determining of the one or more detected input signals, the processing module also determines one or more out indicators, where the output indicators are the alert Level 1, alert Level 2 and alert Level 3 as activated by the controller. Further, at last the actuation module actuates and communicates the selected output indicator by suitable means like as through alert indication unit having one or more alert indicators to the riders.

Figure 8:
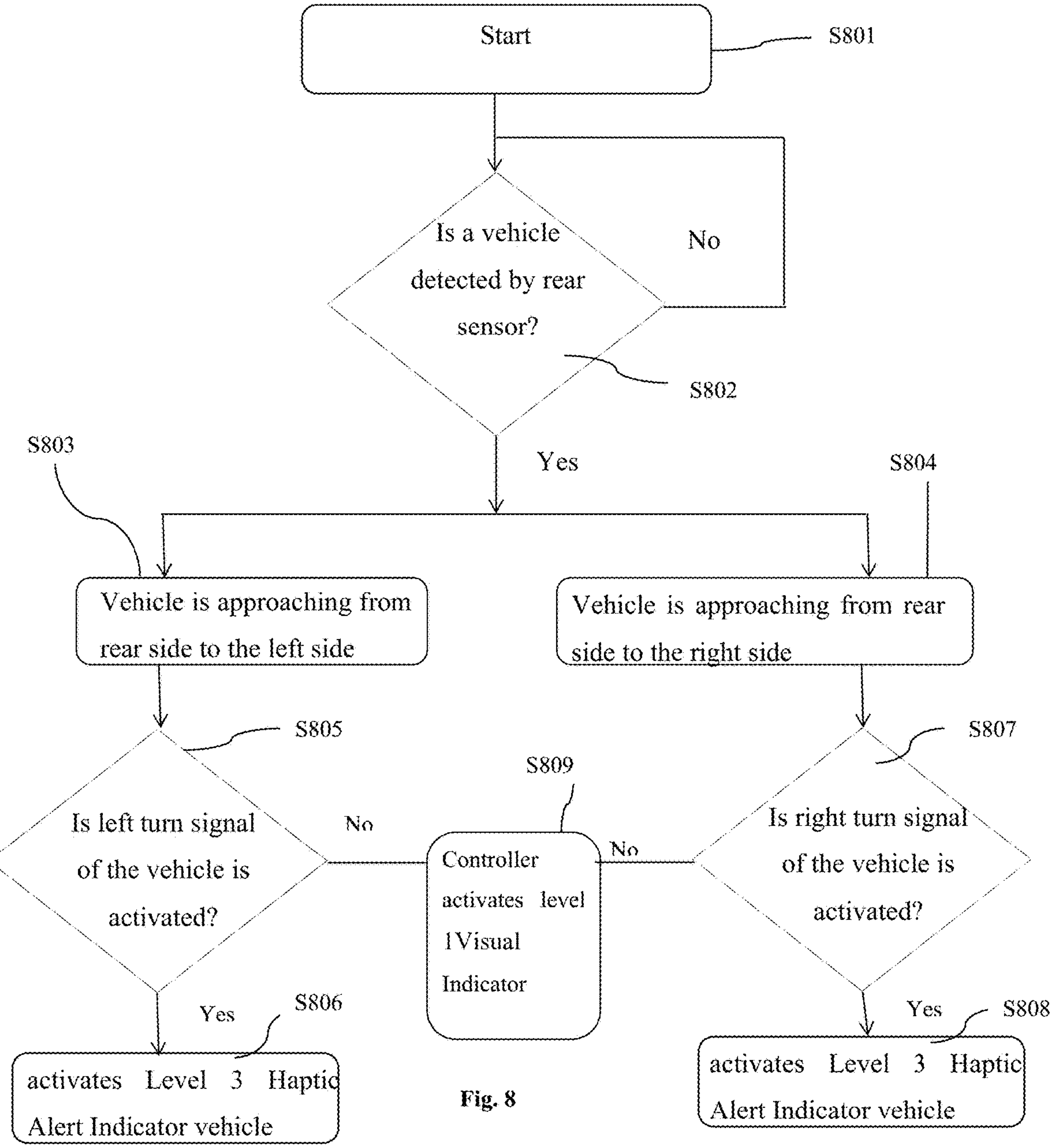
FIG. 8 is a flowchart for the rear collision warning system with plurality of alert indication as per one embodiment of the present invention.

FIG. 8 is a flowchart for the rear collision warning system with plurality of alert indication. After starting of the vehicle at S801, the controller at S802 determines that whether the approaching vehicle/obstacle is detected by the rear sensor. If the controller detects that the vehicle is approaching vehicle is coming from rear side of the vehicle, then certain conditions needed to be checked like as vehicle is approaching from left side of the vehicle or right side of the vehicle. At S803, when the vehicle is approaching from the left side of the vehicle, the controller at S805 determines that whether the left turn signal of the vehicle is ON. If the controller identifies that the vehicle left turn signal is ON, hence, at S806, the controller activates alert or Level 3 and communicates it to the indication control unit. Further, the indication control unit communicates the alert through the haptic alert indicator. At S804, when the vehicle is approaching from the right side of the vehicle, the controller at S807 determines that whether the right turn signal of the vehicle is ON. If the controller identifies that the vehicle's right turn signal is ON, hence, at S808, the controller activates alert Level 3 and communicates it to the indication control unit. Further, the indication control unit communicates the alert through the haptic alert indicator. Further, when the controller at both cases determines that none of the turn signal of the vehicle is ON, then at S809, the controller activates level 1 alert indicator and communicates it to the alert indication unit. The alert indication unit communicates the alert level and risk associated with it through the visual alert indicator. Thus, the one or more level communication of the alert to the rider helps the rider to analyze the risk level associated, the speed of the vehicle etc. This ensures the safety of the rider while riding the vehicle.

The embodiments explained in FIG. 2 and method explained in FIGS. 4, 5, 6, 7 and 8 of the present invention helps in ensuring the communication of different levels of alert along with the risk associated with it to the rider as well as overcoming all the problems known in the art.

Advantageously, the embodiments of the present invention, describes the potential modifications in the alert detection system which generates different alert levels with common system hence, ensuring safety for the riders. This facilitates the simple system which ensures the safety of the riders.

Many other improvements and modifications may be incorporated herein without deviating from the scope of the invention.

LIST OF REFERENCE SYMBOL

FIG. 1:
100: Saddle type Vehicle
126: Handle Bar Assembly
119: Instrument Cluster
127: Head Lamp
131: Front Fender
129: Front Wheel
130: Front Suspension
125: Engine
103: Fuel Tank
134: Seat
138: Rear Fender
133: Rear Wheel
FIG. 2
200: Alert Detection system
201 (201*a*, 201*b*, 201*c*, 201*d*): Sensors
202: Controller
203: Alert Indication Unit
204: DC power Supply Unit
FIG. 2*a*:
202*a*: Receiving Module.
202*b*: Processing Module
202*c*: Actuation Module
FIG. 2*b*
205: Visual Alert Indicator
FIG. 2*d*
206: Haptic Alert indicator

We claim:

1. An alert detection system for a vehicle, the alert detection system comprising:

a sensor unit comprising a plurality of sensors to detect speed of the vehicle, distance and relative velocity of obstacle approaching from front side and rear side of the vehicle, and air pressure in a tire;

a controller comprising a receiving module, a processing module, and an actuation module; and an alert indication unit, wherein the controller:

receives, by the receiving module, one or more input signals from the sensor unit for actuating different types of alerts including collision alert, high speed alert, roll over valve alert, and lane departure alert;

compares, by the processing module, the one or more input signals with a threshold value stored in a lookup table of the controller;

determines, by the processing module, one or more output indicators based on the one or more input signals and the comparison; and actuates, progressively by the actuation module, the one or more output indicators, thereby communicating, by the alert indication unit, a selected output indicator to a rider of the vehicle through the alert indication unit the one or more selected output indicators depend on reaction time of the rider;

wherein the one or more output indicators include a first output indicator, a second output indicator, and a third output indicator which are Level 1 alert, Level 2 alert, and Level 3 alert the one or more output indicators include: one or more of a visual alert indicator and an audio alert indicator for the low risk and moderate risk for the vehicle, and one or more haptic alert indicators for the high risk for the vehicle, and the visual alert indicator is located on a visor of a safety gear worn by the rider, wherein the Level 1 alert has intensity A1 and frequency f1 and indicates mild/low risk to a rider, the Level 2 alert has intensity A2 and frequency f2 and indicates moderate risk to the rider, and the Level 3 alert has intensity A3 and frequency f3 and indicates high risk to the rider, and wherein progressive actuation involves actuation of the first output indicator, the second output indicator, or the third output indicator for the Level 1 alert, the Level 2 alert, or the Level 3 alert.

2. The alert detection system as claimed in claim 1, wherein the Level 1 represents low risk for the vehicle, the Level 2 represents moderate risk for the vehicle, and Level 3 represents high risk for the vehicle.

3. The alert detection system as claimed in claim 1, wherein the sensor unit includes at least a wheel speed sensor, rear sensor, front sensor, and tire pressure sensor.

4. The alert detection system as claimed in claim 1, wherein the vehicle includes a rear view mirror, and the visual alert indicator is located in the rear view mirror.

5. The alert detection system as claimed in claim 1, wherein the one or more haptic alert indicators are located on at least one side of the vehicle with respect to a longitudinal mid plane axis of the vehicle.

6. The alert detection system as claimed in claim 1, wherein the sensor unit is electrically connected to the controller.

7. The alert detection system as claimed in claim 3, wherein each of the front sensor and the rear sensor is one of a radar sensor, a camera, and a lidar sensor.

* * * * *